US 6,628,995 B1

(12) United States Patent
Korson et al.

(10) Patent No.: US 6,628,995 B1
(45) Date of Patent: Sep. 30, 2003

(54) METHOD AND SYSTEM FOR VARIABLE FLIGHT DATA COLLECTION

(75) Inventors: Shannon Lee Korson, Middletown, OH (US); Bruce Gunter Schings, Loveland, OH (US); Packey Pasquale Velleca, Palm Bay, FL (US); Mary Beth Golding, Melbourne Beach, FL (US)

(73) Assignee: General Electric Company, Schenectady, NY (US)

( * ) Notice: Subject to any disclaimer, the term of this patent is extended or adjusted under 35 U.S.C. 154(b) by 364 days.

(21) Appl. No.: 09/637,441

(22) Filed: Aug. 11, 2000

(51) Int. Cl.⁷ .............................................. G05B 21/02
(52) U.S. Cl. ........................... 700/74; 700/39; 700/73; 700/52; 700/53; 700/67; 700/46; 244/3.21; 244/46; 244/904; 434/43; 434/44; 434/45
(58) Field of Search .............................. 700/38, 39, 74, 700/73, 67, 52, 53, 34, 46; 342/25, 62, 194, 419; 345/581, 427; 434/43, 44, 45; 702/48, 56, 100, 144, 199; 244/3.21, 163, 164, 46, 964

(56) References Cited

U.S. PATENT DOCUMENTS

| | | | | |
|---|---|---|---|---|
| 4,470,116 A | * | 9/1984 | Ratchford | 701/35 |
| 4,514,733 A | * | 4/1985 | Schmidtlein et al. | 342/64 |
| 4,652,801 A | * | 3/1987 | Burdett | 318/481 |
| 4,660,145 A | * | 4/1987 | Hansen | 701/14 |
| 4,864,515 A | * | 9/1989 | Deck | 702/142 |
| 4,924,401 A | * | 5/1990 | Bice et al. | 701/6 |
| 5,117,375 A | * | 5/1992 | Worcester et al. | 702/92 |
| 5,276,321 A | * | 1/1994 | Chang et al. | 250/226 |
| 5,409,085 A | * | 4/1995 | Fujino et al. | 187/380 |
| 5,528,490 A | | 6/1996 | Hill | 364/403 |
| 5,661,649 A | * | 8/1997 | Carson et al. | 702/2 |
| 5,818,436 A | * | 10/1998 | Imai et al. | 707/500.1 |
| 6,047,165 A | | 4/2000 | Wright et al. | 455/66 |
| 6,092,008 A | * | 7/2000 | Bateman | 701/14 |
| 6,220,099 B1 | * | 4/2001 | Marti et al. | 73/633 |

* cited by examiner

Primary Examiner—Ramesh Patel
(74) Attorney, Agent, or Firm—V G Ramaswamy; Pierce Atwood

(57) ABSTRACT

Aircraft flight data collection is enhanced by changing the data sampling rate as a function of an operational condition of the aircraft, such as its flight phase. An algorithm is used to determine the flight phase. Then, the data is collected at a first sampling rate when the flight phase is one of a first set of flight phases and collected at a second sampling rate when the flight phase is one of a second set of flight phases. The second sampling rate is greater than the first sampling rate to maximize the data storage capacity of the system. Generally, the higher sampling rate is used with transient flight phases such as takeoff and thrust reverse.

26 Claims, 2 Drawing Sheets

METHOD AND SYSTEM FOR VARIABLE FLIGHT DATA COLLECTION

BACKGROUND OF THE INVENTION

This invention relates generally to aircraft flight data collection and more particularly to collecting flight data at increased sampling rates.

Modem aircraft currently operated by commercial airlines typically employ an onboard data acquisition system for collecting digital flight data. In such systems, a number of sensors distributed throughout the aircraft provide data signals representative of the performance of the aircraft and its engines. This flight data is stored in an attendant, physically robust flight data recorder (commonly referred to as the "black box"), so that in the unlikely event of an in-flight mishap, the flight data recorder can be removed and the stored flight performance data can be analyzed to determine the cause of the mishap. The stored flight data can also be used proactively in diagnostic maintenance of in-flight anomalies.

Flight data recorders collect a predefined set of data parameters at a fixed sampling rate throughout the entire flight. However, many aircraft or engine anomalies require data collected at higher sampling rates to understand and diagnose the problem. Unfortunately, the sampling rate and the number of data parameters that can be collected are limited by the capacity of the recorder's storage medium and the expected duration of the flight, and the storage capacity is limited by physical constraints. In other words, for a given set of data parameters, the sampling rate must be set sufficiently low so that the recorder's storage medium will not be consumed before the flight is completed.

Higher sampling rates are generally available on modem, digital aircraft through the use of digital flight data acquisition units (DFDAUs) or data management units (DMUs). While higher sampling rate data is available, the problem becomes one of storing large amounts of data, particularly over many flights. Thus, most data storage devices like quick access recorders (QARs) are limited to recording data at a fixed, relatively low rate. Another known storage device is the data storage unit in a wireless data link. A wireless data link is essentially a system in which flight data collected during a flight is stored in the data storage unit. When the aircraft lands, the flight data is downloaded via a wireless link to a flight control center computer located at the airport. These devices typically collect data at a fixed sampling rate that is limited by the capacity of the data storage medium.

Accordingly, there is a need for method and system for collecting flight data that can increase the sampling rate and the number of data parameters collected without consuming the available data storage capacity before the flight ends.

BRIEF SUMMARY OF THE INVENTION

The above-mentioned need is met by the present invention which provides a method and system for collecting flight data from an aircraft in which an operational condition of the aircraft, such as the flight phase, is determined. Then, the data is collected at a first sampling rate when the flight phase is one of a first set of flight phases and collected at a second sampling rate when the flight phase is one of a second set of flight phases. The second sampling rate is greater than the first sampling rate.

The present invention and its advantages over the prior art will become apparent upon reading the following detailed description and the appended claims with reference to the accompanying drawings.

BRIEF DESCRIEION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
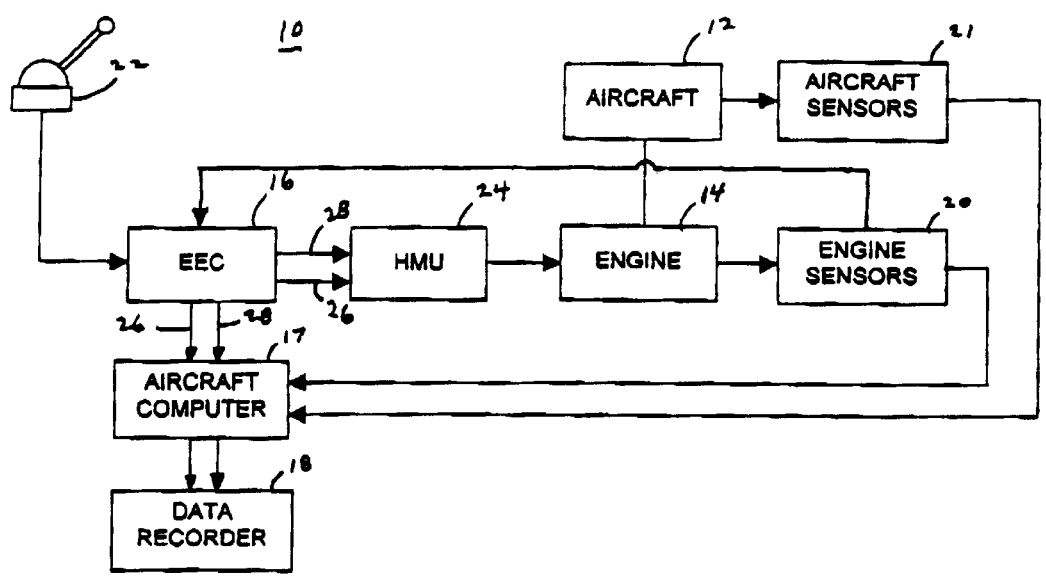
FIG. 1 is a schematic block diagram of a flight data collection system.

Referring to the drawings wherein identical reference numerals denote the same elements throughout the various views, FIG. 1 shows a block diagram of system 10 for collecting flight data from an aircraft 12 having at least one engine 14 mounted thereon. Although only one engine 14 is shown in FIG. 1, it should be noted that the aircraft 12 could have additional engines mounted thereon. As will be apparent from the following description, data collection for such additional engines would be accomplished in a manner identical to that for engine 14. Therefore, only the engine 14 and its associated equipment will be described herein.

The system 10 includes an electronic engine controller (EEC) 16, which is preferably a full authority digital engine control (FADEC) although other controllers could be used, an onboard aircraft computer 17, a data recorder 18 and a set of conventional engine feedback sensors 20. A set of conventional aircraft sensors 21 (which sense the aircraft's air speed and altitude among other parameters) is also provided. The onboard aircraft computer 17, which can be any conventional device such as a flight data acquisition unit (FDAU), a digital flight data acquisition unit (DFDAU) or a data management unit (DMU), receives signals from the engine sensors and the aircraft sensors 21. The data recorder 18 receives output from the aircraft computer 17. As used herein, the term "data recorder" is intended to encompass traditional flight data recorders, quick access recorders, data storage units for wireless data links, or any other type of in-flight data storage devices. The engine feedback sensors 20 can comprise any group of sensors that monitor the engine parameters of interest. For gas turbine engines, these parameters would typically include exhaust gas temperature, engine fuel flow, core speed, compressor discharge pressure, turbine exhaust pressure, fan speed, and the like.

The EEC 16 receives signals from the engine feedback sensors 20 and various other components and sensors in the aircraft 12 as is known in the art. The EEC 16 also receives a thrust request signal from a throttle 22 controlled by the aircraft's pilot. In response to these inputs, the EEC 16 generates command signals to operate engine actuators, such as a hydromechanical unit (HMU) 24 which meters the flow of fuel to the engine 14. The HMU 24 is a unit that is well known to those skilled in the art. The EEC 16 also outputs data signals to the aircraft computer 17. Some EECs, particularly FADECs, have two or more communication channels capable of providing duplicate outputs of the command signals to the HMU 24 and duplicate outputs of the data signals to the aircraft computer 17. Although not identical, the data and command signals contain related information. For purposes of illustration, the EEC 16 is shown as having two communication channels: an active channel 26 and an inactive channel 28. However, it should be noted that the present invention is also applicable to EECs having a different number of channels. Although the EEC 16 has two channels 26 and 28 providing data, only the active channel 26 controls the engine 14. The purpose for dual channels is to provide a redundancy feature; if there is a malfunction such that the active channel 26 becomes inoperative, then the inactive channel 28 becomes active and provides the data for controlling the engine 14. The EEC output contains information defining which channel is active.

The data recorder 18 includes an algorithm that samples flight data from both channels of the aircraft computer 17. The algorithm could alternatively be loaded onto the EEC 16, which would supply a sampling command to the data recorder 18. The algorithm is designed such that the flight data is sampled at a sampling rate that changes as a function of an operational condition of the aircraft 12. One type of aircraft operational condition that can be employed to dictate the sampling rate is the aircraft's flight phase. Transient flight phases, such as take off, are usually the most interesting from a diagnostic point of view and are where engine anomalies most frequently occur. Thus, it is during these flight phases where high sampling rates are the most advantageous. During steady state flight phases, such as steady cruise, high sampling rates are unnecessary because of generally slow changing conditions. The algorithm of the present invention exploits this difference in the flight phases by identifying the aircraft's flight phase, and then uses a low or high sampling rate accordingly. By using a high sampling rate only during the conditions where high sample data is needed for diagnostic purposes (and using a much lower sampling rate at all other times), the data storage capacity is used much more efficiently. This means that the sampling rate and the number of data parameters collected can be increased as needed without risk of consuming the available data storage capacity before the flight ends.

An alternative type of aircraft operational condition that can be employed to dictate the sampling rate is the aircraft's Out, Off, On, In (OOOI) phase. The OOOI system is employed to track aircraft, wherein "Out" refers to the aircraft being out of the gate, "Off" refers to the aircraft being off the ground, "On" refers to the aircraft being on the ground, and "In" refers to the aircraft being in the gate. In this case, the algorithm identifies the aircraft's OOOI phase and uses a low or high sampling rate accordingly. Typically, the high sampling rate would be used for the Off phase, and the low sampling rate would be used for all other phases.

Figure 2:
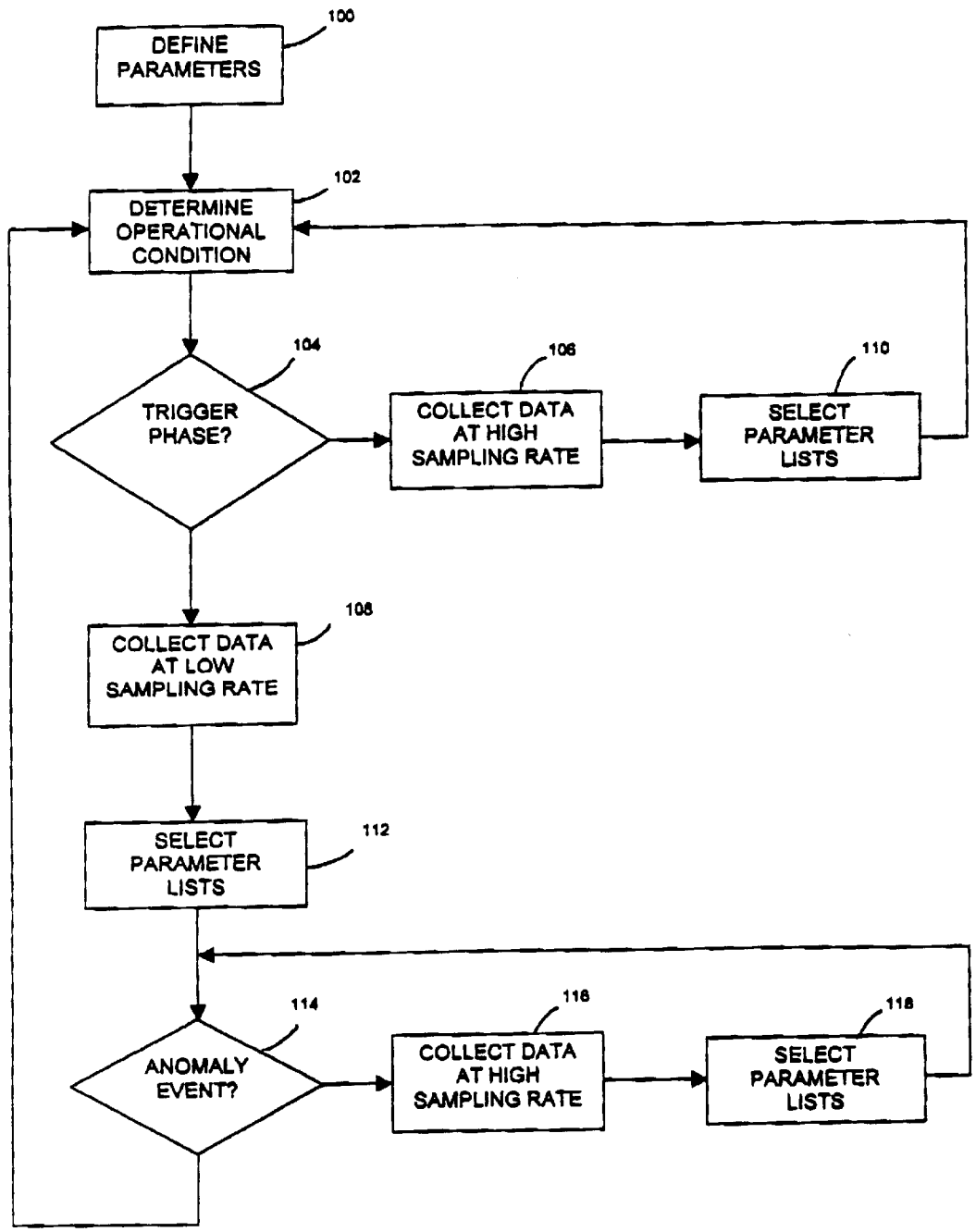
FIG. 2 is a flow chart illustrating a method for collecting aircraft flight data.

Referring now to FIG. 2, the algorithm is described in more detail. Prior to a flight, the system parameters are defined as shown at block 100. Here, the system user is able to define the data parameters that will be collected during the various phases of the flight; particularly what data parameters will be collected at a high sampling rate and what data parameters will be collected at a low sampling rate. Which data parameters will be collected from the active channel 26 and from the inactive channel 28 are also defined. The user can also set the low and high sampling rates and for which flight phases data will be collected at the high sampling rate.

The algorithm is initiated when the flight commences. The first step, shown at block 102, is to determine the operational condition of the aircraft 12. Although other schemes could be used, the aircraft's flight phase is one preferred type of operational condition to monitor. Thus, the following discussion will focus on using the flight phase to dictate the sampling rate, although it should be noted that other operational conditions could be used alternatively. As is well known in the industry, an aircraft goes through a number of different phases during a normal flight. These flight phases are generally recognized to be engine start, taxi out, takeoff, climb, cruise, descent, landing, thrust reverse, taxi in and engine shutdown. In most instances, cruise is the longest phase during a flight. The algorithm uses input from the aircraft sensors 21, particularly the air speed and altitude inputs, to determine the flight phase.

Next, at block 104, the algorithm inquires as to whether the current flight phase is a trigger phase. As used herein, a "trigger phase" refers to any flight phase for which a high sampling rate is desired. As mentioned above, transient phases are generally the flight phases for which high sampling rates are the most advantageous for diagnostic purposes because these are where engine anomalies are most likely to occur. Engine start, takeoff and thrust reverse are the primary transient flight phases where high sampling rate data are of interest and are therefore usually selected to be trigger phases. Other transient phases such as climb, descent and landing could also be selected as trigger phases depending on the data storage capacity of the data recorder 18 relative to the expected duration of the flight. That is, if the duration of the flight is short enough that the collection of additional high sampling rate data would not consume the storage capacity before the end of the flight, then the additional trigger phases could be selected. Generally, the steady state cruise phase is not selected as a trigger phase. By using a low sampling rate during cruise, which is typically the longest phase of the flight, use of the data storage space is maximized. The algorithm is configured such that the trigger events can be selected or changed; that is, the algorithm can be reprogrammed to change which flight events will trigger the low sampling rate and which ones will trigger the high sampling rate. This is done in the set up step of block 100.

If the current flight phase determined at block 102 is a trigger phase, then the algorithm causes the data recorder 18 to collect data at the high sampling rate as indicated at block 106. On the other hand, if the current flight phase determined at block 102 is not a trigger phase, then the algorithm causes the data recorder 18 to collect data at the low sampling rate as indicated at block 108. The sampling rates are dictated by hardware limitations, namely how fast the hardware can sample data. Preferably, the high sampling rate will be equivalent to the highest output rate of the EEC 16 and/or the aircraft computer 17. The low sampling rate will be substantially less. The high sampling rate will generally be at least 5–10 times greater than the low sampling rate. The sampling rates can also be changed or reprogrammed in the set up step of block 100.

The algorithm determines which data parameters are to be recorded depending on whether the data recorder 18 is collecting at the low or high sampling rate. This is based on a pair of data parameter lists that are defined at block 100. Specifically, there are separate data parameter lists for the low and high sampling rates. When the data recorder 18 is collecting at the high sampling rate, the algorithm, at block 110, causes the data parameters from the high sampling rate list to be recorded, and when the data recorder 18 is collecting at the low sampling rate, the algorithm, at block 112, causes the data parameters from the low sampling rate list to be recorded. The EEC 16 outputs many data parameters. Some of these are used in control of the engine 14 and others are not. Examples of data parameters that are used in engine control include engine speeds, temperatures and pressures. Examples of data parameters not used in engine control include signals from condition monitoring sensors that are used to monitor engine health. The low sampling rate list will generally include data parameters that are used both for control and diagnostic purposes, while the high sampling rate list will generally include only the data parameters that are used for engine control. These are the data parameters that are most useful in understanding and diagnosing engine anomalies.

For low and high rate sampling, the algorithm also determines, at blocks 112 and 110 respectively, the data parameters that will be collected from the active channel 26 and the data parameters that will be collected from the inactive channel 28. Both channels 26 and 28 output all data necessary for controlling the engine 14. However, much of the data output by the EEC 16 that are not used in engine control are output through only one or the other of the channels 26 and 28. Since the active channel 26 is controlling the engine 14, the data parameters output by this channel are the most useful. While the inactive channel 28 contains useful information as well, most of the data parameters are redundant and do not need to be recorded. Thus, each of the low and high sampling rate data parameter lists is broken down into two sub-lists. One comprising the data parameters that are collected from the active channel 26, and the other comprising the data parameters that are collected from the inactive channel 26. These sub-lists are defined at block 100. As mentioned before, the EEC output contains information defining which channel is active. Consequently, the algorithm identifies the active channel and selects the active channel sub-list for the active channel 26 and the inactive channel sub-list for the inactive channel 28. This is accomplished at block 110 for high sampling rate data collection, and at block 112 for low sampling rate data collection.

During low sampling rate data collection, the algorithm also has the capability of switching to the high sampling rate in response to an anomaly event. This is accomplished at block 114 by monitoring the engine and/or aircraft feedback data for anomalies. If an anomaly event is detected, then the algorithm causes the data recorder 18 to collect data at a high sampling rate as indicated at block 116 and 118. Typical anomaly events that would trigger this change are detected engine faults, operating parameters at an abnormal level or abnormal engine behavior. The higher sampling rate records sufficiently detailed information for later diagnosis of the anomaly. The high sampling rate data collection of blocks 116 and 118, which continues as long as the anomaly occurs, is substantially the same as that described above for blocks 106 and 110. The same high sampling rate can be used for trigger phases and anomaly event detection; it is also possible to tailor the high sampling rates. That is, a different elevated sampling rate could be used for anomaly event detection than for trigger phases.

If no anomaly event is detected at block 114, then the algorithm thereafter continually monitors the flight phase at block 102 such that the process can be switched to the high sampling rate if the flight phase changes to a trigger phase. Likewise, during high sampling rate data collection at blocks 106 and 110, the algorithm continually monitors the flight phase at block 102 such that the process can be switched to the low sampling rate if the flight phase changes to a non-trigger phase. This process loop will continue for the duration of the flight.

The foregoing has described a system and method for collecting flight data at a high sampling rate in a manner that efficiently uses the available data storage capacity. While specific embodiments of the present invention have been described, it will be apparent to those skilled in the art that various modifications thereto can be made without departing from the spirit and scope of the invention as defined in the appended claims.

What is claimed is:

1. A method for collecting flight data from an aircraft capable of flying at various operational conditions, said method comprising:
   determining the operational condition of said aircraft;
   collecting data at a first sampling rate when said operational condition is one of a first set of operational conditions; and
   collecting data at a second sampling rate when said operational condition is one of a second set of operational conditions, wherein said second sampling rate is greater than said first sampling rate.

2. The method of claim 1 wherein operational conditions are the flight phases of said aircraft and said first set of operational conditions comprises non-transient flight phases and said second set of operational conditions comprises transient flight phases.

3. The method of 2 wherein said first set of flight phases comprises cruise phase and said second set of flight phases comprises engine start, takeoff and thrust reverse phases.

4. The method of claim 1 wherein said second sampling rate is at least 5–10 times greater than said first sampling rate.

5. The method of claim 1 wherein a first set of data parameters is collected when collecting data at said first sampling rate and a second set of data parameters is collected when collecting data at said second sampling rate.

6. The method of claim 1 further comprising:
   monitoring said aircraft for anomalous events; and
   collecting data at a third sampling rate when an anomalous event is detected, wherein said third sampling rate is greater than said first sampling rate.

7. The method of claim 6 wherein said third sampling rate is equal to said second sampling rate.

8. A method for collecting flight data from an aircraft capable of flying at various flight phases and having at least one engine and a corresponding engine controller, said method comprising:
   determining the flight phase of said aircraft;
   collecting data from said engine controller at a first sampling rate when said flight phase is one of a first set of flight phases; and
   collecting data from said engine controller at a second sampling rate when said flight phase is one of a second set of flight phases, wherein said second sampling rate is greater than said first sampling rate.

9. The method of claim 8 wherein said first set of flight phases comprises non-transient flight phases and said second set of flight phases comprises transient flight phases.

10. The method of 9 wherein said first set of flight phases comprises cruise phase and said second set of flight phases comprises engine start, takeoff and thrust reverse phases.

11. The method of claim 8 wherein said second sampling rate is at least 5–10 times greater than said first sampling rate.

12. The method of claim 8 wherein a first set of data parameters is collected when collecting data at said first sampling rate and a second set of data parameters is collected when collecting data at said second sampling rate.

13. The method of claim 12 wherein said first set of data parameters includes data parameters that are used for control of said engine and data parameters that are used for diagnostic purposes and said second set of data parameters only comprises data parameters that are used for control of said engine.

14. The method of claim 12 wherein said engine controller has first and second communication channels, and wherein a first subset of said first set of data parameters is collected from said first channel and a second subset of said first set of data parameters is collected from said second channel, and a first subset of said second set of data parameters is collected from said first channel and a second subset of said second set of data parameters is collected from said second channel.

15. The method of claim 8 further comprising:
monitoring said engine for anomalous events; and
collecting data at a third sampling rate when an anomalous event is detected, wherein said third sampling rate is greater than said first sampling rate.

16. The method of claim 15 wherein said third sampling rate is equal to said second sampling rate.

17. A system for collecting flight data from an aircraft capable of flying at various flight phases and having at least one engine and a corresponding engine controller, said system comprising:
means for determining the flight phase of said aircraft; and
means for collecting data from said engine controller, wherein data is collected at a first sampling rate when said flight phase is one of a first set of flight phases and at a second sampling rate when said flight phase is one of a second set of flight phases, said second sampling rate being greater than said first sampling rate.

18. The system of claim 17 wherein said first set of flight phases comprises non-transient flight phases and said second set of flight phases comprises transient flight phases.

19. The system of claim 18 wherein said first set of flight phases comprises cruise phase and said second set of flight phases comprises engine start takeoff and thrust reverse phases.

20. The system of claim 17 wherein said second sampling rate is at least 5–10 times greater than said first sampling rate.

21. The system of claim 17 wherein said means for collecting data collects a first set of data parameters when collecting data at said first sampling rate and a second set of data parameters when collecting data at said second sampling rate.

22. The system of claim 21 wherein said first set of data parameters includes data parameters that are used for control of said engine and data parameters that are used for diagnostic purposes and said second set of data parameters only comprises data parameters that are used for control of said engine.

23. The system of claim 17 wherein said engine controller has first and second communication channels, and said means for collecting data collects a first set of data parameters from said first channel and a second set of data parameters from said second channel.

24. The system of claim 17 further comprising means for monitoring said engine for anomalous events, wherein said means for collecting data collects data at a third sampling rate when an anomalous event is detected, said third sampling rate being greater than said first sampling rate.

25. The system of claim 24 wherein said third sampling rate is equal to said second sampling rate.

26. The system of claim 17 further comprising sensors for sensing engine and aircraft conditions, said sensors supplying signals to said means for collecting data.

* * * * *